C. M. CONRADSON.
CARRIAGE BED FOR LATHES.
APPLICATION FILED JAN. 3, 1917.

1,352,183. Patented Sept. 7, 1920.

INVENTOR
CONRAD M. CONRADSON
BY Paul Hart
HIS ATTORNEYS.

UNITED STATES PATENT OFFICE.

CONRAD M. CONRADSON, OF MADISON, WISCONSIN.

CARRIAGE-BED FOR LATHES.

1,352,183.   Specification of Letters Patent.   Patented Sept. 7, 1920.

Application filed January 3, 1917. Serial No. 140,339.

*To all whom it may concern:*

Be it known that I, CONRAD M. CONRADSON, a citizen of the United States, resident of Madison, in the county of Dane and State of Wisconsin, have invented certain new and useful Improvements in Carriage-Beds for Lathes and like Machines, of which the following is a specification.

The object of the invention is to provide an improved carriage bed for lathes and like machines so that the carriage will better balance on the bed and the compensating wear of the contacting surfaces between the guides of the bed and the carriage will be better provided for.

The invention consists generally in the construction and combination hereinafter described and sought to be clearly defined by the claim.

Figure 1:
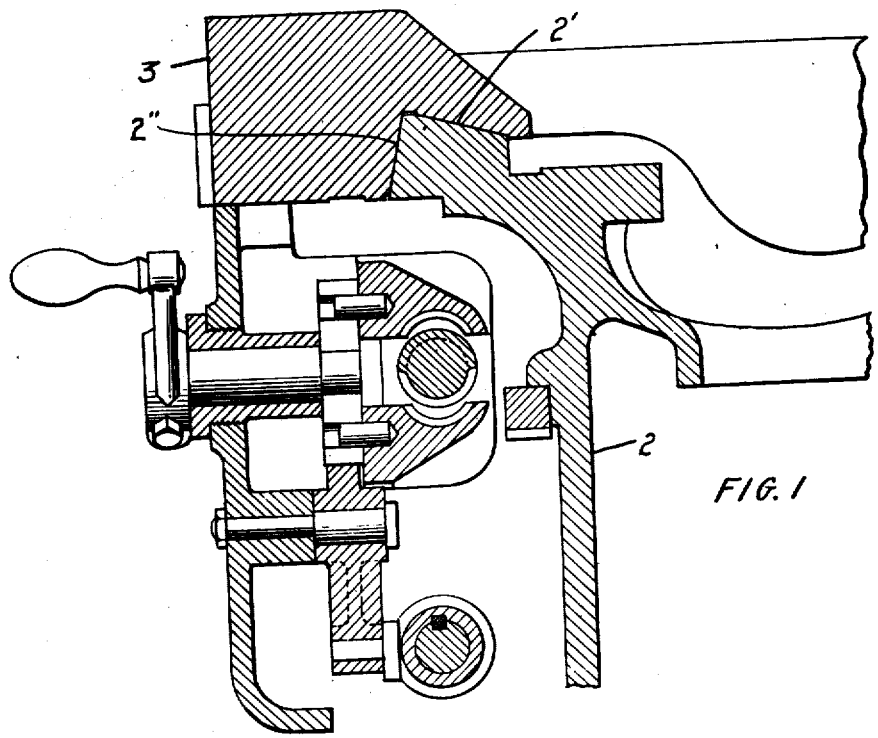
Figure 2:
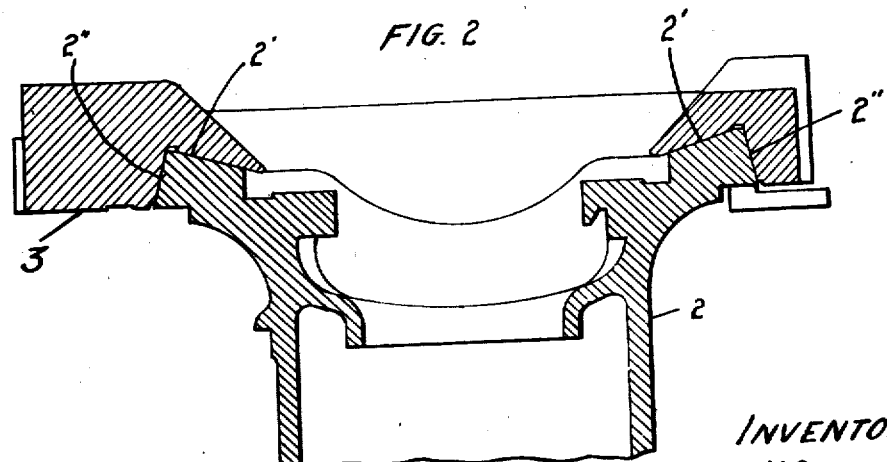

In the accompanying drawing is shown an embodiment of the invention in a lathe bed, and in which Figure 1 is a transverse sectional view through a carriage, showing means for connecting it with the usual lead screw; and Fig. 2 is a transverse sectional view through a carriage and bed.

In the drawing the numeral 2 designates part of a machine or lathe bed; and 3 part of a carriage. The bed of the machine or lathe is provided with oppositely disposed correspondingly formed guides 2'—, the upper surfaces thereof having a slight downward inclination from a horizontal and the the side surfaces a slight downward and outward inclination from a vertical plane. These guides are designed to enter correspondingly formed V-shaped grooves 2" made in the carriage 3. The result of this construction is that the angle formed by the meeting faces of the guides and grooves is obtuse and the wear of the contacting faces is compensated for to such a degree that there will be practically no lost motion in movement of the carriage; the top surfaces of the guides afford a broad and but slightly inclined surface to take the vertical component of the load, being inclined oppositely to each other, and the carriage is guided laterally by double inclined surfaces, the angle being slight to a vertical plane. I have found this to be an important construction as it insures balancing and uniformity in movement of the carriage, and the wear between the contacting surfaces is more evenly compensated for.

Having described my invention and set forth its merits what I claim is:

The combination with a lathe carriage, of a bed for the carriage having oppositely disposed correspondingly formed guides, the upper surfaces thereof having a slight downward and inward inclination from a horizontal and the side surfaces a slight downward and outward inclination from a vertical plane, said carriage being formed with grooves correspondingly shaped to the guides to receive them.

In witness whereof, I have hereunto set my hand this 13th day of December, 1916.

CONRAD M. CONRADSON.